United States Patent [19]

Vinogradov

[11] 4,434,483
[45] Feb. 28, 1984

[54] TONE ARM

[76] Inventor: Vladimir F. Vinogradov, ulitsa Gorkogo, 135, kv.17, Riga, U.S.S.R.

[21] Appl. No.: 325,586

[22] Filed: Nov. 27, 1981

[51] Int. Cl.³ .................... G11B 17/02; G11B 21/16; G11B 3/10
[52] U.S. Cl. .................... 369/255; 369/244; 369/251
[58] Field of Search .................... 369/255, 244, 251

[56] References Cited

U.S. PATENT DOCUMENTS

| 2,542,534 | 2/1951 | John .................... 369/244 |
| 2,993,698 | 7/1961 | Stanton .................... 369/255 |
| 4,114,895 | 9/1978 | Eckhart .................... 369/251 |

FOREIGN PATENT DOCUMENTS

1001499 1/1957 Fed. Rep. of Germany ...... 369/244

*Primary Examiner*—Steven L. Stephan
*Attorney, Agent, or Firm*—Burgess, Ryan & Wayne

[57] ABSTRACT

A tone arm comprising a lever with a pickup cartridge on its end and a tracking-force setup assembly, a movable base connected to the lever, and a fixed base, the two bases facing each other. Installed between said bases are a vertical pivot attached to one of the bases and cooperating with a spherical thrust bearing in the other base, and a ball making contact with one of the bases and cooperating with a guiding element in the other base. The guiding element may represent an arched slot, two equidistant arched lugs or a spherical hole.

8 Claims, 14 Drawing Figures

TONE ARM

FIELD OF THE INVENTION

The present invention relates to electric record players and in particular to tone arms.

The tone arm forming the subject of the invention may be used to advantage in high-fidelity electric record players.

PRIOR ART

Known in the art are tone arms employing pivoted or needle supports which possess a small moment of forces resisting a tone arm turn in vertical or/and horizontal planes (cf. FRG Pat. No. 1,171,170, French Pat. No. 1,448,146, British Pat. No. 1,019,603, etc.).

In such tone arms a gimbal comprises a base with needle supports, which is rotatable with respect to a vertical geometrical axis, said supports mounting a tone arm base rotatable with respect to a horizontal geometrical axis of rotation and formed by needle supports, the gimbal being a two-hinge structure. In the foregoing devices the horizontal and vertical geometrical axes of rotation of the tone arm lever are formed by separate pairs of bearings, a disadvantage reducing sensitivity due to the need for overcoming static friction as the tone arm moves up and down and from side to side when a record is being played.

Such tone arms entail a labor-consuming production process and are difficult to manufacture. Furthermore, considerable difficulties are involved in their adjustment.

A tone arm disclosed in U.S. Pat. No. 2,993,698 entails simpler production and adjustment processes. Its gimbal employs a single-point support. Such a tone arm comprises a lever with a pickup cartridge on its end, and a tracking-force setup assembly. The lever performs the function of a movable base of the tone arm gimbal and has a hole over which a holder (spherical thrust bearing) is secured. Vertically mounted on a fixed base of the gimbal secured to a panel of an electric record player is a pin with a pointed top (pivot) passing through the hole in the lever and cooperating with the spherical thrust bearing. A vertical geometrical axis of rotation of the lever passes through a point of interaction between the pointed top of the pin and the spherical bearing.

However, the aforesaid tone arm has been generally unsatisfactory due to an increased frictional force as it moves in both (horizontal and vertical) planes, another disadvantage being an inadequate tracking characteristic due to an unavoidable gap between the pin and the hole in the tone arm. Such a tone arm may not be longitudinally stabilized.

Moreover, in the aforesaid tone arm and other prior art tone arms a tracking-force setup assembly provides a constant tracking force as a record is being played. Stated differently, the tracking force does not change as the tone arm moves from the outer periphery towards the center of the record or in tracking the high and low places in the record.

On the other hand, it is known that a phonograph record is continuously compressed from the edge to the center of a record as the same signal is being recorded. Consequently, the steepness of the walls of a record groove increases towards the center, and the tracking force of a tone arm must accordingly change (increase in the given case) as the tone arm moves towards the center of the record being played.

For example, to track the starting grooves of a record, stable bending movement may be achieved by applying a tracking force of 0.5 g, min (the value generally provided for by modern pickup cartridges wherein the flexibility of a moving system is $10 \cdot 10^{-3}$ m/n); to track the final grooves, a tracking force of 0.8 g, min may be required due to the record compression effect. Thus, the tracking force should increase smoothly by 0.3 g during reproduction or should remain constant (0.8 g) as the record is being played. The first method is, however, preferable since, in the latter case, the starting grooves of a record are worn out prematurely.

Providing the known tone arms having the aforedescribed gimbals with means for changing the tracking force in the course of reproduction would impair the performance of the gimbals. More specifically, it would substantially increase frictional forces in shafts.

BRIEF DESCRIPTION OF THE INVENTION

It is an object of the present invention to improve performance of a tone arm, and increase service life of a record and a reproducing stylus.

Another object of the invention is to reduce frictional forces in a gimbal as a tone arm moves.

One more object of the invention is to improve a tracking characteristic of a tone arm.

A further object of the invention is to provide a facility for automatically changing the tracking force during reproduction.

A still another object of the invention is to increase durability of a record and a reproducing stylus.

The foregoing objects are accomplished by that in a tone arm comprising a lever with a pickup cartridge on its end and tracking-force setup assembly, two bases facing each other, one of the bases being a movable member integral with the lever, while the second base is a fixed member to be affixed to a panel of an electric record player, a vertical pivot attached to one base and cooperating with a spherical thrust bearing in the other base, a vertical geometrical axis of rotation of the lever being extended through an interaction point thereof, according to the invention, a ball disposed between the bases is in contact with one of the bases and cooperates with a guiding element in the other base, a horizontal geometrical axis of rotation of the lever being formed by a straight line passing through the point of interaction between the pivot and the spherical thrust bearing, and through a point of contact between the ball and the base.

Preferably the guiding element represents an arched slot extended along a circumference with its center on the vertical geometrical axis.

The guiding element may represent a spherical hole, the radius of its sphere exceeding slightly the radius of the ball, or two equidistant arched lugs, while the second base mounts an additional guiding element, which is structurally similar to the main guiding element and is arranged opposite said guiding element.

To change the tracking force in the course of reproduction, the tracking-force setup assembly desirably represents a magnetic pair comprising a magnet and a ferromagnetic element separated therefrom by a suitable gap, one element of the magnetic pair being rigidly coupled to the movable base, while the second element of said magnetic pair is rigidly attached to the fixed base.

When both bases mount the guiding element, it is of advantage that the element of the magnetic pair rigidly attached to the fixed base is arranged so that a maximum flow from the magnetic pair passes through a perpendicular to a bisector of an angle formed by extremes of the horizontal geometrical axis with the tone arm lever being turned a complete revolution about the vertical geometrical axis to reproduce sound within the entire grooved surface of a record, the perpendicular intersecting the vertical geometrical axis.

The tone arm forming the subject of the present invention is characterized by high-fidelity reproduction and substantially reduced frictional forces in a gimbal. Provision is also made for changing the tracking force during reproduction, a factor resulting in such apparent advantages as a longer service life of the record and reproducing stylus. Furthermore, a rolloff force may be compensated for in accordance with its variation law by locating, in compliance with the invention, the electromagnet of the pressing-force setup assembly in proper position with respect to geometrical axes of the tone arm.

A simple novel structure of a gimbal in the herein-proposed tone arm provides minimum friction in horizontal and vertical axes of rotation of the tone arm (less than 7 mg), which is an apparent advantage over most of foreign-made high-fidelity tone arms. The tracking force may be changed in quite a number of ways in various embodiments of the invention.

The tone arm in compliance with the invention entails a simple production process. The number of parts in the herein proposed tone arm is reduced by about two times, as compared with prior art tone arms. Morearm, most of its parts are cast and stamped items, another advantage being reduced dimensions of the pickup.

Minimum friction in geometrical axes of rotation of the tone arm, the possibility of adjusting the tracking force and the associated advantages provide technical-and-economic indices enabling the use of the tone arm in high-class electric record players.

BRIEF DESCRIPTION OF DRAWINGS

The invention will now be described further with reference to specific embodiments thereof, taken in conjunction with the accompanying drawings, wherein.

DETAILED DESCRIPTION OF THE INVENTION

Figure 1:
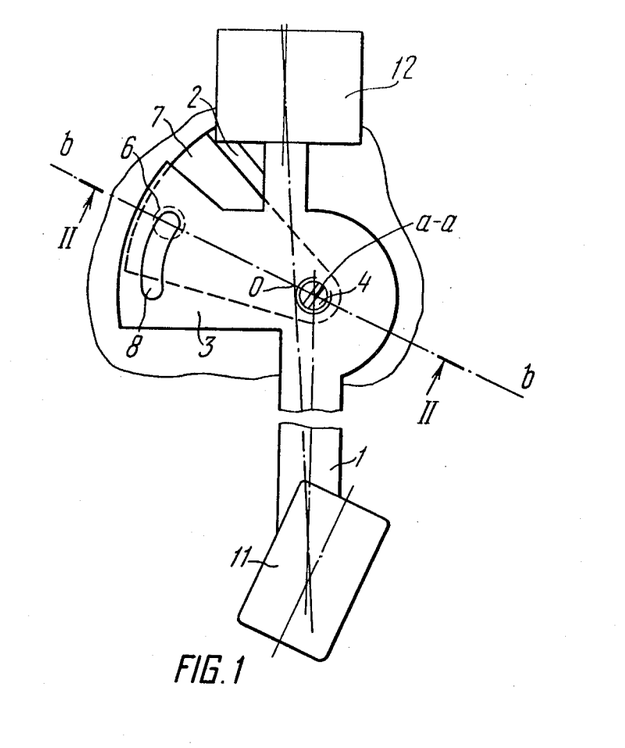
FIG. 1 is a top view of a tone arm according to the invention.
Figure 2:
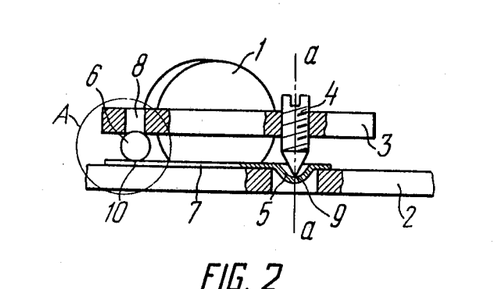
FIG. 2 is a section along II—II of FIG. 1 depicting a guiding element on a movable base.

The tone arm illustrated in FIGS. 1 and 2 comprises a lever 1, a lower fixed base 2 affixed to a panel of an electric record player (not shown in the drawing), an upper movable base 3 integral with the lever 1, a vertical pivot 4 secured, in a preferred embodiment of the invention, to the movable base 3 and cooperating with a spherical thrust bearing in the base 2. Besides, a ball 6 disposed between the bases 2 and 3 is in contact with a supporting plate 7 on the base 2 and cooperates with a guiding element (an arched slot 8 in the preferred embodiment of the invention). A vertical geometrical axis a—a of rotation of the lever 1 passes through a point 9 of interaction between a pointed portion of the pivot 4 and the thrust bearing 5, while a horizontal geometrical axis b—b of rotation of the lever 1 is formed by a straight line passing through the same point 9 and through a point 10 of contact between the ball 6 and the supporting plate 7 on the base 2. The generating lines of the arched slot 8 are found on a circumference with its center on the vertical axis a—a. The length of the slot 8 is chosen to provide free movement of the lever 1 throughout the entire recorded area from the starting to the final grooves. One end of the lever 1 mounts a pickup cartridge 11, while the opposite end carries a tracking-force setup assembly 12 of the cartridge 11 (a counterbalance in the preferred embodiment of the invention). A point 0 in FIG. 1 illustrates a possible position of the center of mass of the tone arm.

As the pickup stylus moves over uneven surfaces of a record, i.e., during movement of the cartridge 11 in a vertical plane, the working bearing surfaces of the pivot 4 and the ball 6 (the points 9 and 10, respectively) rock over the bearing surfaces of the plate 7 of the base 2.

The invention allows appreciably reducing friction in horizontal and vertical axes of the tone arm due to exclusion of sliding-friction sources. In the horizontal and vertical axes of the tone arm there occurs rolling friction of said bearing surfaces whereby a moment of frictional forces in the tone arm support is substantially reduced, an advantage assuring movement of the pickup over the record without a braking effect. The obtained friction is about 5 mg, as referred to a force applied to the pickup stylus.

Figure 3:
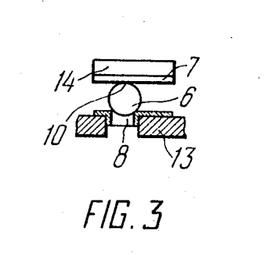
FIG. 3 is a section A of FIG. 2 depicting the guiding element on a fixed base.

FIG. 3 illustrates another embodiment of the invention with the ball 6 installed in a different manner. In the preferred embodiment of the invention the slot 8 is made in a lower fixed base 13, while the plate 7 of an upper movable base rests against the ball 6 at the point 10. The guiding element may be constructed in different ways, say, as a hinge secured to one of the bases, etc.

In the tone arm forming the subject of the present invention an undesirable gap is eliminated, which is an apparent advantage over the prior art. The performance of the pickup is improved to a considerable extent by increasing structural rigidity and reducing the unbalance of cartridge channels, other positive features being improved isolation of channels, decreased wow and flutter, and the possibility of longitudinal stabilization of the tone arm.

Figure 4:
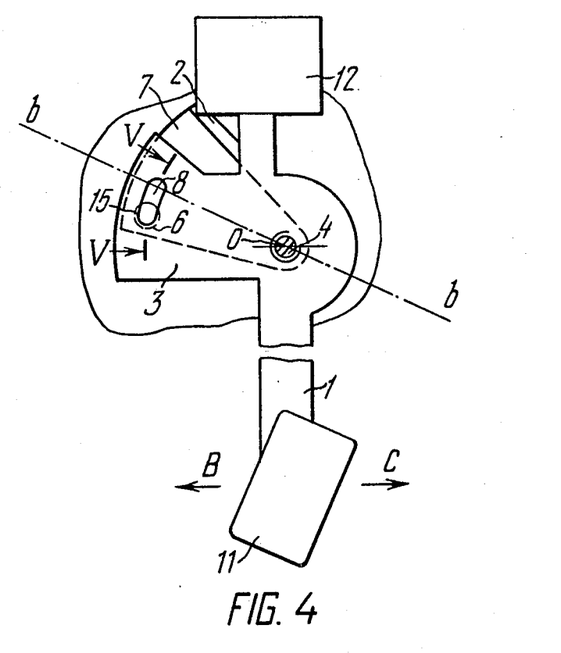
FIG. 4 is a top view of a preferred embodiment of the tone arm compensating for a rolloff force.
Figure 5:
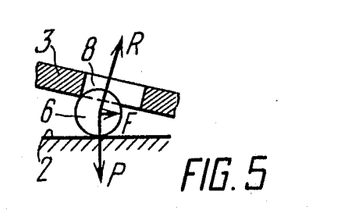
FIG. 5 is a diagram illustrating distribution of forces acting on the tone arm of FIG. 4.

In the embodiment of FIGS. 4 and 5 there occurs useful distribution of frictional forces as the tone arm rotates about the vertical axis a—a whereby the rolloff-force compensation effect is achieved.

As distinct from the tone arm of FIGS. 1 and 2, in the preferred embodiment of the invention the length of the slot 8 is somewhat shorter than the length required to move the lever 1 through the entire grooved surface of a record. Also, one of the bases (the movable base 3 in the preferred embodiment of the invention) is inclined with respect to the base 2 in the direction opposite to the direction of movement of the lever 1 during reproduction.

Without a radial runout (eccentricity) created by a record and electric record players, a rolloff force could be compensated by merely increasing a frictional force in a vertical axis of the tone arm.

However, under actual conditions any disc record is characterized by eccentricity of a central opening with respect to a record field. So, during reproduction the tone arm performs a reciprocating motion. As the tone arm moves with respect to the center of the record, a frictional force is added to a rolloff force in a vertical axis. Thus, in the known devices the frictional force in the vertical axis is reduced to a minimum, which, as a rule, is achieved by utilizing expensive methods, say, by using ruby and sapphire balls in bearings. The rolloff force is compensated for by applying a compensating force equal in magnitude but opposite in direction. This is accomplished by utilizing springs, magnetic and gravitational forces.

In the embodiments of FIGS. 4 and 5 the rolloff force is compensated for in the following manner.

Assume that the base 3 mounting the pickup cartridge 11 and the counterbalance 12 turns about the vertical axis a—a of the tone arm while the lever 1 moves towards the center of a record as indicated by arrow B. The ball 6 resting against an edge 15 of the slot 8 moves with sliding friction over the plate 7 of the base 2.

A force of sliding friction determined by the position of the counterbalance 12, i.e., by the position of the center of gravity 0, is chosen to be equal to the value of a rolloff force but has an opposite direction. As a result, the rolloff force will be adequately compensated.

The base 3 rolls away while the lever 1 moves from the center of a record as indicated by arrow C (due to eccentricity). The ball 6 moves (rolls) over the plate 7 of the base 2 with minimum rolling friction, whereas sliding friction is eliminated.

In this case, an antirolloff moment is set up due to the fact that at least one of the bearing surfaces of the upper or lower base (the base 3 in the embodiment of FIG. 3) is inclined.

Thus, as the lever 1 moves towards the center of the record, the rolloff force is compensated for due to sliding friction, the rolloff force is compensated for due to sliding friction between the ball 6 and the plate 7 of the base 2. As the lever 1 stops or moves back from the center of the record, the compensation occurs due to a force F set up as a result of decomposition of a gravitational force P into components.

Figure 6:
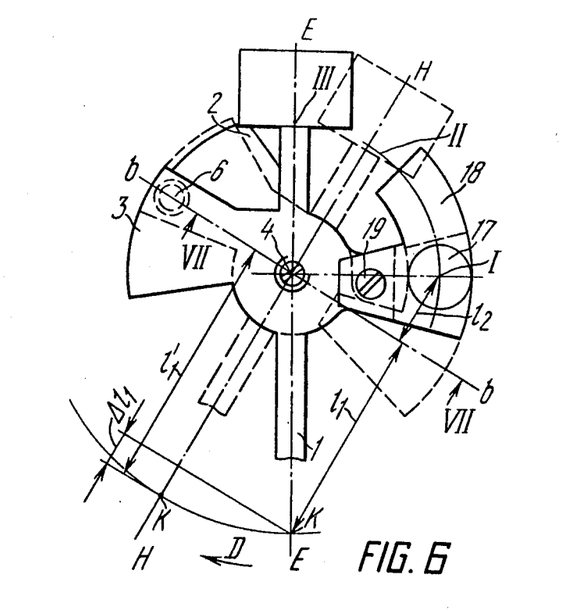
FIG. 6 is a top view of another embodiment of the tone arm with the guiding element representing a spherical hole in the fixed base according to the invention.
Figure 7:
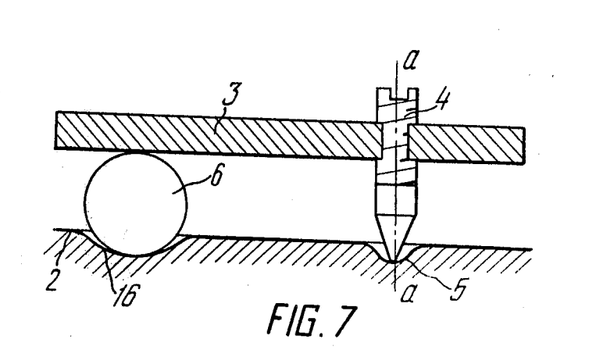
FIG. 7 is a section along VII—VII of FIG. 6.

As distinct from the embodiment of FIGS. 1 and 2, the tone arm illustrated in FIGS. 6 and 7 has the guiding element representing a spherical hole 16, the radius of its sphere exceeding slightly the radius of the ball 6, said spherical hole being provided in the fixed base 3. Besides, in the preferred embodiment of the invention the tracking-force setup assembly represents a magnetic pair comprising an electromagnet 17 and an armature 18 separated therefrom by a suitable gap. The electromagnet is secured to the fixed base 3, while the armature 18 is attached to the movable base 2. The attachment may be reversed with the electromagnet 17 secured to the base 2 and the armature 18 attached to the base 3. The armature 18 is held in place with a screw 19. The electromagnet 17 may be secured at different points on the base 3, say, in positions I, II, or III.

When the tone arm operates (turns as indicated by arrow D), the upper base 3 slides over the ball 6, while the ball 6 and the lower base 2 remain stationary.

The dashed line in the drawing shows the position of the lever 1 as it moves towards the center of a record.

During reproduction, the pressing force is changed as follows.

When the pickup stylus k tracks the starting grooves of the record, the pressing force is determined by the relationship $$F_1 = \frac{F_2 \cdot l_2}{l_1},$$

where $F_1$ is the pressing force; $l_1$ is an arm of the force $F_1$, i.e., the distance from the stylus k to the horizontal axis b—b of the tone arm; $F_2$ is a force developed by the electromagnet 17 ($F_2$=const); and $l_2$ is an arm of the force $F_2$, i.e., the distance from the electromagnet 17 to the horizontal geometrical axis b—b of the tone arm. In the drawing the electromagnet 17 is in position I, E—E indicates the position of the lever 1 on the starting grooves of the record, and H—H indicates the position of the lever 1 on the final grooves of the record.

As the stylus k moves from the position E to the position H, $l_1$ (the arm of the force $F_1$) increases by $\Delta l_1$, while $l_2$ does not change. As a result, the tracking force $F_1$ decreases. A similar relationship between the forces and arms is obtained when the electromagnet 17 is located at other points on the base 3, say, in positions II or III.

Figure 8:
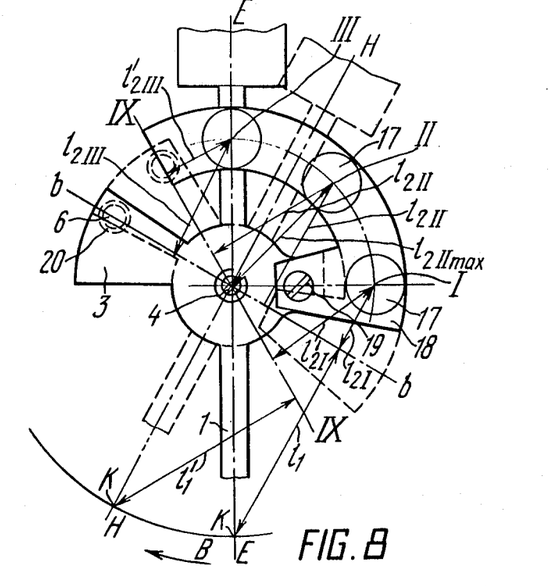
FIG. 8 illustrates the embodiment of FIG. 6 with the hole in the movable base.
Figure 9:
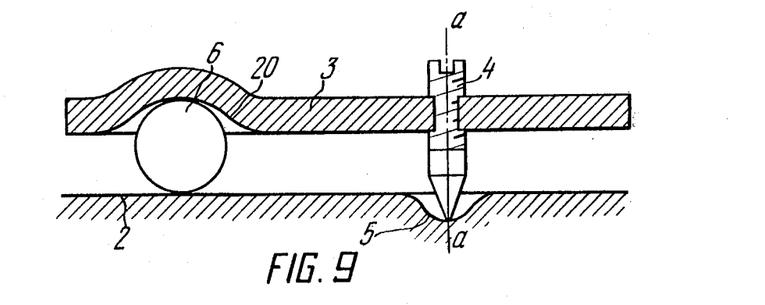
FIG. 9 is a section along IX—IX of FIG. 8.

FIGS. 8 and 9 illustrate one more embodiment of the invention. As distinct from the previous embodiment the guiding element (spherical hole 20) is provided in the movable upper base 3, and the ball 6 is displaced together with the base 3 relative to the fixed base 2 during movement of the lever 1.

In operation with the electromagnet 17 in position I, the arm $l_1$ does not change, and the arm $l_{2-I}$ increases. Consequently, $F_1$ increases at $F_2$=const.

When the electromagnet 17 is set to position II (turned through a certain angle) as the tone arm is operative, the arm $l_1$ does not change, and the arm $l_{2-II}$ increases and then, after a certain maximum value $l_{2-II}$ is reached, decreases equalling the initial value of $l_{2-II}$. The tracking force $F_1$ being directly proportional to the quantity $l_2$ will change in a similar manner.

Figure 10:
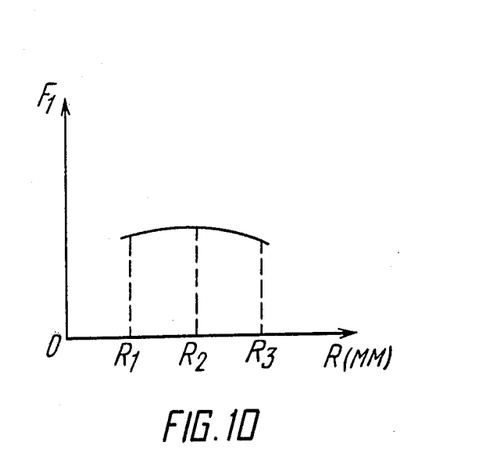
FIG. 10 is a plot illustrating variations of the tracking force acting on the tone arm of FIGS. 8, 9.

The above process is illustrated in the plot of FIG. 10 depicting variations of the tracking force $F_1$. In the drawing the ordinate is the tracking force $F_1$, and the absissa is radius R of the reproducing groove (mm), $R_1$ being the radius of the starting groove and $R_3$ being the radius of the final groove.

In the preferred embodiment of the invention a rolloff force is compensated for in accordance with its variation law.

Figure 11:
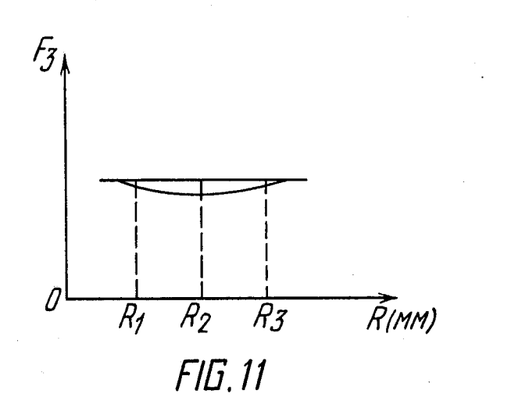
FIG. 11 is a plot illustrating variations of a rolloff force in the tone arm according to the invention.

From the existing publications it is known that the rolloff force $F_3$ in electric record players changes in accordance with a complicated law, as in FIG. 11, and depends on the value of the tracking force $F_1$.

A principal difficulty involved in designing means for compensating the rolloff force $F_3$ lies in providing a compensating force changing in the same manner as the force $F_3$.

Table I illustrates the dependence of the rolloff force $F_3$ on the reproduction radius R with the tracking force $F_1$ being a constant value. Table II illustrates the dependence of the rolloff force $F_3$ on the radius R with the tracking force $F_1$ being a variable quantity.

TABLE I

| | $F_1$ | $F_3$ |
|---|---|---|
| $R_1$ | 1.0 | 0.12 |
| $R_2$ | 1.0 | 0.1 |
| $R_3$ | 1.0 | 0.12 |

TABLE II

| | $F_1$ | $F_3$ |
|---|---|---|
| $R_1$ | 1.0 | 0.12 |
| $R_2$ | 1.2 | 0.12 |
| $R_3$ | 1.0 | 0.12 |

Referring to Table 1 it is seen that a minimum value $F_3=0.1$ is obtained with the mean groove radius $R_2$.

Referring to Table II it is apparent that, if the tone arm provides for a variation of the tracking force $F_1$, the rolloff force $F_3$ will be constant over the entire grooved area regardless of the reproduction radius R. Its compensation by a force equal in magnitude and opposite in direction will, then, be a simple problem solved virtually in every electric record player.

When the electric magnet 17 in position III while the tone arm is operative, the arm $l_1$ does not change, the arm $l_2$ decreases, and the pressing force $F_1$ decreases, accordingly.

Figure 12:
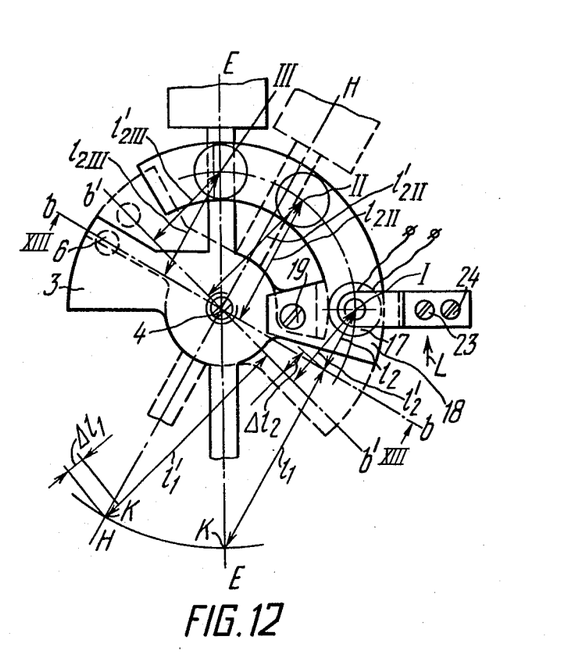
FIG. 12 is a top view of one more embodiment of the tone arm with the guiding elements disposed on the two bases according to the invention.
Figure 13:
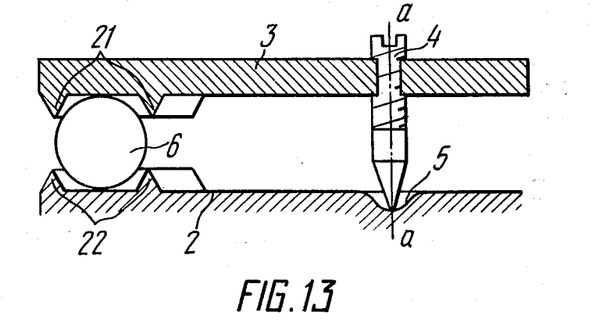
FIG. 13 is a section along XIII—XIII of FIG. 12.

In the embodiment of FIGS. 12 and 13 the guiding element represents two equidistant arched lugs on the base 3 extended along circumferences with a center in the vertical geometrical axis a—a, while the base 2 mounts an additional guiding element comprising two equidistant lugs 22 structurally similar to the main guiding element and arranged opposite said main guiding element. In the illustrated embodiment of the invention the ball 6 is displaced with respect to the bases 2 and 3 when the lever 1 turns. As a result, there may be obtained the following relationships between the pressing force $F_1$ and the arms $l_1$, $l_2$, depending on the position of the electromagnet 17. Reference numerals 23 and 24 denote fastening screws.

In position I of the electromagnet 17, as the lever 1 moves towards the final grooves of the record, the arm $l_2$ of the force $F_2$ will increase more rapidly than the arm $l_1$ of the force $F_1$. Since the tracking force $$F_1 = \frac{F_2 \cdot l_2}{l_1},$$

then at $\Delta l_2 > \Delta l_1$ the force $F_1$ will smoothly change but in a slower manner as compared with the embodiment of FIGS. 7 and 8.

With the electromagnet 17 in position II, the arm $l_2$ changes by a smaller amount than the arm $l_1$. Thus, the pressing force $F_1$ decreases.

In position III of the electromagnet 17, as distinct from the previous two embodiments (positions I and II of the electromagnet 17), the arm $l_{2-III}$ will decrease, a condition resulting in a sharp decrease of the force $F_1$.

The electromagnet 17 is advantageously secured in a position at which a maximum flow from the magnetic pair passes through a perpendicular to a bisector of an angle formed by extremes of the horizontal geometrical axis b—b with the lever 1 turned through a complete revolution about the vertical geometrical axis a—a to reproduce the entire groove surface of a record, the perpendicular intersecting the vertical geometrical axis a—a.

In all the preferred embodiments of the invention the force of the magnetic pair contributes to distribution of a vertical pressure among the supporting elements of the gimbal (the pivot 4, the thrust bearing 5, the guiding elements, and the ball). The performance of the tone arm is not impaired due to the absence of an adverse lateral pressure.

Using the preferred embodiments of the invention allows obtaining different laws of variation of the tracking force, a feature advantageous in many aspects in designing pickups, say, in compensating for a rolloff force in accordance with its variation law or/and in automatically changing the value of the tracking force.

Figure 14:
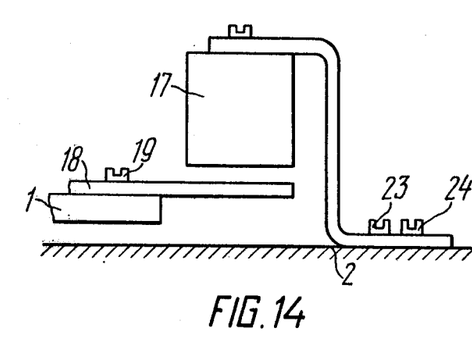
FIG. 14 is a view along arrow L of FIG. 12 depicting a pressing-force setup assembly according to the invention.

FIG. 14 illustrates an embodiment of an electromagnetic device for creating a tracking force (a view along arrow L in FIG. 12). The electromagnet 17 is secured to the fixed base 2 by means of the screws 23 and 24. The armature 18 is installed on the lever 1. The electromagnet 17 and the armature may be arranged in quite a number of different ways. For example, the armature 18 may be installed on the base 2, while the lever 1 mounts the electromagnet 17.

What is claimed is:

1. A tone arm comprising: a lever installed in a manner allowing rotation thereof about vertical and horizontal geometrical axes; a pickup cartridge secured on an end of said lever; means for setting the tracking force of said pickup cartridge; a movable base integral with said lever; a fixed base arranged opposite said movable base and designed to be attached to a panel of an electric record player; a spherical thrust bearing in one of said bases; a vertical pivot with a pointed portion interacting with said spherical thrust bearing in one base, its other end being secured on said other base; a guiding element in one of said bases; a ball arranged between said bases, said ball cooperating with said guiding element in one of the bases and making contact with the second base at a point of contact; said vertical geometrical axis of rotation of said lever being extended through a point of interaction between said pointed portion of said pivot and said spherical thrust bearing; said horizontal geometrical axis of rotation of said lever being formed by a straight line passing through said point of interaction between said pivot and the spherical thrust bearing, and through said point of contact.

2. A tone arm as claimed in claim 1, wherein said guiding, element represents an arched slot extended along a circumference with its center on said vertical geometrical axis.

3. A tone arm as claimed in claim 1, wherein said guiding element represents a spherical hole, the radius of its sphere exceeding slightly the radius of said ball.

4. A tone arm as claimed in claim 1, wherein said guiding element represents two equidistant arched lugs extended along circumferences with a center thereof lying on said vertical geometrical axis, provision being also made for an additional guiding element which is structurally similar to the first guiding element and is arranged opposite said first element on said second base.

5. A tone arm as claimed in claim 1, wherein said tracking-force setup assembly represents a magnetic pair, a first element of said magnetic pair being rigidly coupled to said movable base, while a second element of said magnetic pair is rigidly attached to said fixed base.

6. A tone arm as claimed in claim 4, wherein said tracking-force setup assembly represents a magnetic pair, a first element of said magnetic pair being rigidly coupled to said movable base, while a second element of said magnetic pair is rigidly attached to said fixed base.

7. A tone arm as claimed in claim 6, wherein said element of said magnetic pair rigidly attached to the fixed base is arranged so that a maximum magnetic field from said magnetic pair passes normal to the plane of and through a bisector of an angle formed by two extreme positions of said horizontal geometrical axis as said lever is turned about said vertical geometrical axis so as to reproduce sound from the entire grooved surface of a grooved disc record.

8. A tone arm comprising:
a horizontal fixed base;
a movable base disposed above said fixed base, said horizontal and movable bases having adjacent upper and lower surfaces respectively;
a lever integral with said movable base and having a free end, said lever being rotatable about horizontal and vertical geometrical axes;
a pickup cartridge secured to the free end of said lever;
means for setting the tracking force of said pickup cartridge;
a spherical thrust bearing in one of said upper and lower surfaces of one of said bases;
a vertical pivot having one end terminating in a point bearing against said spherical thrust bearing of said one surface of said one base, said pivot having another end secured to the adjacent surface of the other base;
a guiding element in one of said surfaces;
a ball disposed between said bases at a position horizontally spaced from said pivot, said ball engaging said guiding element in one of said surfaces and in contact with the other of said surfaces to a point vertically aligned with said guiding element;
said lever having a vertical geometrical axis of rotation extending through said point of bearing of said pivot against said spherical thrust bearing;
said lever having a horizontal geometrical axis of rotation formed by a straight line passing through (i) said point of contact of said ball with said other of said surfaces and (ii) said point of bearing of said pivot against said spherical bearing surface.

* * * * *